United States Patent [19]

Köppelmann et al.

[11] Patent Number: 4,486,314
[45] Date of Patent: Dec. 4, 1984

[54] PROCESS FOR THE HANDLING OF WASTE WATERS

[75] Inventors: Edgar Köppelmann, Hilden; Gerd Krapp, Dusseldorf; Klaus Schumann, Erkrath; Heinz G. Smolka, Langenfeld, all of Fed. Rep. of Germany

[73] Assignee: Henkel Kommanditgesellschaft auf Aktien, Dusseldorf, Fed. Rep. of Germany

[21] Appl. No.: 581,225

[22] PCT Filed: Jan. 21, 1981

[86] PCT No.: PCT/EP81/00004
§ 371 Date: Jun. 23, 1982
§ 102(e) Date: Jun. 23, 1982

[87] PCT Pub. No.: WO82/02542
PCT Pub. Date: Aug. 5, 1982

Related U.S. Application Data

[63] Continuation of Ser. No. 395,011, Jun. 23, 1982, abandoned.

[51] Int. Cl.$^3$ .................................... C02F 1/56
[52] U.S. Cl. .................................... 210/714; 210/727
[58] Field of Search ............... 210/666, 667, 714, 716, 210/723, 727

[56] References Cited

U.S. PATENT DOCUMENTS

| | | | |
|---|---|---|---|
| 3,300,406 | 1/1967 | Pollio | 210/666 |
| 3,388,060 | 6/1968 | Clark | 210/714 |
| 3,617,561 | 11/1971 | Fanselow | 210/716 X |
| 3,909,406 | 9/1975 | Lang | 210/716 |
| 3,963,640 | 6/1976 | Smith | 210/716 X |
| 4,098,714 | 7/1978 | Derleth et al. | 210/716 X |

Primary Examiner—Thomas Wyse
Attorney, Agent, or Firm—Ernest G. Szoke; Nelson Littell, Jr.

[57] ABSTRACT

Process for the treatment of sewage by using conventional precipitants and flocculants, like silicates, iron- or aluminum salts or organic polymers, and in addition about 0.1–10 (0.03–3) g/l sewage of X-ray amorphous or crystalline, finely-divided alkali- and/or alkaline earth-alumosilicates of the formula:

$$x\ cat_{2/n} \cdot Al_2O_3 \cdot y\ SiO_2$$

where $x = 0.7–1.5$; $y = 0.8–6$; $cat = Na$, $K$, $Mg$ or $Ca$; $n = 1–2$. The compounds contain preferably bound water. The alumosilicate is added preferably in the form of an aqueous suspension (pH 3.5–5.0) to the sewage to be treated, adjusted if necessary to a weakly alkaline to weakly acid pH-value (5–10). The pH-value is preferably adjusted with strong acids, preferably sulfuric acid.

In sewage from laundries, which can already contain $x$ g alumosilicates, the amount is reduced by $x$ g.

Advantage: Compared to known processes, the dirt elimination rate is greater and/or the consumption of precipitants is reduced. The separated impurities are deposited in large floccules, and the separated sludges contain less water.

13 Claims, No Drawings

PROCESS FOR THE HANDLING OF WASTE WATERS

This application is a continuation of application Ser. No. 395,011 filed June 23, 1982 now abandoned.

The invention concerns a process for the treatment of sewage using precipitants and flocculants.

Some industrial manufacturing sectors, such as the paper- and cardboard industry, as well as commercial laundries use large amounts of water which end up as sewage, partly laden with considerable portions of ingredients. From an ecological and economical viewpoint, the treatment of this sewage represents a problem of constantly increasing importance. In the sewage treatment generally used today, the cleaning of the sewage is effected in a combined precipitation and degradation process. The precipitation is effected by adding precipitants and flocculants to the sewage by which a major part of the ballast materials dissolved or dispersed in the water is transformed together with the precipitants and flocculants into an easily separable form, mostly into a non-slimy flocculant deposit. A number of precipitants and flocculants are described in the literature. In addition to organic polymeric compounds based on acrylamide, for example, lime, as well as hydrolyzing iron- and aluminum salts and silicates are described primarily as precipitants for cleaning sewage. Thus a water-treatment process is known from U.S. Pat. No. 2,310,009 where an aged, aqueous mixture of a sodium silicate solution and an aluminum sulfate solution is used as a precipitant.

German Pat. No. 971,180 described acid $SiO_2$-brines containing iron- or aluminum salts for the treatment of sewage. A similar process working with brines containing less $SiO_2$ is described in British Pat. No. 827,586. U.S. Pat. No. 3,235,444 describes a process for the treatment of sewage from the manufacture of paper where the flocculation is effected by adding aluminum sulfate and activated silica to the sewage. Activated silica and aluminum sulfate for the treatment of highly contaminated sewage are also described in "Zellstoff und Papier" 13 (1964) p. 331 ff, where the activated silica is produced by the introduction of chlorine gas into waterglass solutions. These known treatment methods cannot be fully satisfactory, because they are not effective enough; besides, they require large amounts of precipitants, and the sludges obtained are voluminous and rich in water, which renders any possible after-treatment of the sludges and their deposit difficult.

The use of amorphous alkali-aluminosilicate dispersions, which are produced by mixing aqueous alkalisilicate- and aluminum salt solutions under vigorous shearing, is known from DE-OS No. 22 29 895 as the Norwich process. In this process the dispersions are used "in situ" for the precipitation of sewage ingredients, so that a plant for the production of these special dispersions must be operated in these sewage treatment plants. It is obvious that troubles can easily be caused by the necessary adaptation of these two plants to each other.

The object of the present invention was therefore to provide a simple process for the treatment of sewage, which is more effective and also supplies sludges that are easier to handle.

This problem is solved by the process according to the invention, which is characterized in that, in addition to the usual precipitants and flocculants, ab. 0.1–10 g per liter sewage of an X-ray amorphous or crystalline, finely divided alkali metal and/or alkaline earth metal alumosilicate containing preferably bound water, of the formula

$$x \, cat_{2/n}O \cdot Al_2O_3 \cdot y \, SiO_2$$

where x has a value of 0.7–1.5, y a value of 0.8–6, cat denotes sodium, calcium, potassium or magnesium, and n equals 1 or 2, are added to the sewage to be treated, which has been adjusted, if necessary, to a weakly alkaline or weakly acid pH-value, and that the precipitate formed is separated from the water.

Suitable finely-divided alumosilicates contain practically no particles over $50\mu$, preferably over $30\mu$. The particle size is generally between 0.1 and $10\mu$.

Known precipitates are, e.g. aluminum- or iron sulfate and alkalisilicates which form voluminous deposits when added to sewage, on which sewage ingredients are adsorbed, which are removed from the sewage during the separation of the precipitates. By adding flocculants to the sewage, the effectiveness of the precipitants is enhanced. Known flocculants are e.g. certain anionic or nonionic high-molecular acrylic polymers, like the commercial products "Hercofloc" by Hercules, or "Ferrocryl" by Henkel, or polymeric basic aluminum-salts, for example, "Sachtoklar" by Sachtleben Chemie.

The alumosilicate used according to the invention can be obtained in a simple manner by reacting water-soluble silicates with water-soluble aluminates in the presence of water. Amorphous alumosilicates are precipitated, which can be used as a suspension or after, separation and drying, as a powder for the process according to the invention. The amorphous alumosilicates can be transformed into the crystalline state by heating their aqueous suspensions, and be used either as a powder, after drying the separated solids, or without separation as an aqueous suspension for the process according to the invention, treated if necessary with acid. In the production of the alumosilicates we start generally from the alkali metal compounds and obtain accordingly alkali metal alumosilicates. Because of their availability in large technical quantities, crystalline alumosilicates are preferably used, particularly the zeolites A,P,X and Y known from the literature (see D. W. Breck, Zeolite Molecular Sieves, Publ. by Wiley & Sons, Inc. 1974, p. 48 and 49, as well as p. 133, 168, 176 and 177), or the X-ray amorphous compounds of the corresponding composition, preferably in amounts of 0.1–10 g per liter sewage. An addition of 0.1 g per liter sewage is necessary if only slightly polluted water is to be treated, while 10 g per liter are required for the treatment of highly polluted water. 0.2 to 5.0 g are sufficient in most cases. Normally polluted water requires generally an addition of 0.3–3.0 g per liter sewage. If the sewage already contains x g alumosilicate per liter sewage, that is, if we are dealing with sewge from laundries which use alumosilicate-containing detergents, correspondingly less alumosilicate is added to the sewage for carrying out the process of the invention, (0.10–10 g per liter, less x gram per liter) as a powder or as a suspension, so that the sewage has the above-mentioned concentrations of alumosilicate.

Surprisingly it was found that the alkaline earth compounds of the above-mentioned alumosilicates can also be used for the process of the invention; but it is not advisable to convert the alkali metal alumosilicates into the alkaline earth silicates, e.g. by exchanging the bases, since the use of alkaline earth-alumosilicates brings no advantage over alkali metal alumosilicates. Rather the alumosilicates are present at least partly as alkaline earth compounds if sewage containing liquors of alumosilicate-containing detergents is treated. The alumosilicates can be used in the form of a finely divided powder. Depending on the drying conditions applied, the alumosilicates may contain either no bound water or varying amounts of bound water or adhering moisture. The water content has no effect on the effectiveness. But since the alumosilicates usually contain bound water and adhering moisture from the synthesis and only the application of higher temperatures during drying leads to anhydrous products, alumosilicates which contain bound water are preferred. Another form in which the alumosilicates can be added to the treated sewage is that of an aqueous suspension. Particularly effective are alumosilicate-suspensions if the normally highly alkaline suspensions are adjusted by the addition of acid to a pH-value between about 3.5 and 5.0. In order to increase the efficiency, it is furthermore preferred to adjust the sewage to be treated to a pH-value between about 5.0 and 10.0. If laundry sewage is to be treated, an addition of acid is likewise required to adjust the pH-value of the alkali-rich sewage. Suitable for the adjustment of the pH-value both of the alumosilicate suspension and of the sewage is the addition of a readily available strong non-pollutant mineral acid, particularly sulfuric acid.

The procedure according to the invention results in higher dirt-elimination rates, compared to the known processes, and/or in the use of lesser amounts of precipitents. The separated sewage ingredients are obtained in large floccules, compared to conventional methods which use exclusive precipitants and flocculants, and are deposited and are easier to separate, e.g. by filtering, decanting or centrifuging. The separated sludges contain in addition less water, which facilitates dumping. The alumosilicates to be added are cheap commercial products which are available in large quantities compared to known commercial processes, which work with unstable $SiO_2$-brines, they are easy to handle. The process according to the invention is not critical regarding the maintenance of the process parameters; these can vary within wide limits without affecting the result of the treatment or other advantages of the process.

Such a treatment can be effected wherever sewage is produced, so that the communal sewage treatment plants can be greatly relieved if desired, the sewage can be cleaned to such an extent, because of the great effect that can be achieved with the process of the invention, that it can be used again, and even several times as service water so that it is only necessary to replace water losses. This way processes with a high water consumption can be greatly improved in their economy. In addition, less and less polluted water is fed to the communal sewage treatment plants.

EXAMPLES

The mode of operation and the effectiveness of the process according to the invention will be described in the following examples. The sewage used for the tests originated from washing processes; it therefore contained detergent ingredients (e.g. surfactants, electrolytes, detergent phosphates and other organic builder substances) and soil (soluble and insoluble, e.g. pigments, dyes, protein, fat). The precipitations for the cleaning were carried out in the laboratory in agitator vessels containing 250 ml sewage at ab. 30 to 35 deg.C. under stirring with a propeller agitator (500 to 700 rpm). The precipitated deposits were separated by filtering over fluted filters (Selecta no. 597½, ϕ185 mm). In order to enhance the flocculation, a commercial flocculant (a highmolecular, highly anionic acrylic polymer with a molecular weight of $8-10.10^6$, "Hercofloc 821", Hercules Powder) was added in a concentration of about 10 ppm to the sewage in all examples, in addition to the precipitants indicated in the individual examples.

The soil load of the sewage used and of the cleaned water was indicated by determining the COC-value (chemical oxygen consumption) in mg $O_2/l$, described e.g. in "Vom Wasser" 46 (1976), p. 139 ff, and by determining the phosphate content according to the molybdate method.

An alumosilicate used in carrying the process of the invention, is, e.g. the commercial product "HAB A 40" by Degussa, which has the composition $1.03Na_2O.1Al_2O_3.1.94SiO_2$. The particle size of this product was 100% under 20μ and 98.6% under 10μ. The mean particle diameter, determined with the Coulter counter (volume distribution) was 3.8μ. In examples 1 to 21 "alumosilicate" means this product.

EXAMPLES 1-3

Example 1 is an example of a process of the state of the art, where aluminum sulfate was used as a precipitant.

Example 2 describes a test according to the process of the invention where alumosilicate was used in addition to aluminum sulfate. By using an additional 0.5 g/l alumosilicate, the elimination of the soil, expressed by the COC-value, rose from 61% to 72%, which corresponds to an improvement in the cleaning of the sewage by 18%, due to the addition of alumosilicate. This effect can be further increased if the aluminum sulfate content is increased (example 3). Without the addition of alumosilicate, the precipitated products are rich in water (90% water content) poorly filtrable and there are after-precipitations; when alumosilicate is added, the water content of the precipitated products drops to about 60%, and easily filtrable macrofloccules are formed without any after-precipitations being observed. The precipitation of phosphates is likewise favorably influenced by the addition of alumosilicate. The elimination rates rise from 76% originally to 95%. This also applies to the other tests.

TABLE 1

| example | a | b | c | d before | d after | d elim. % | e before | e after | e elim. % | f | j |
|---|---|---|---|---|---|---|---|---|---|---|---|
| 1 | 405 | — | — | 2155 | 839 | 61 | 506 | 121 | 76 | + + | poor |
| 2 | 405 | — | 0.5 | 2050 | 574 | 72 | 486 | 72 | 83 | — | good |
| 3 | 640 | — | 0.5 | 2050 | 370 | 82 | 486 | 23 | 95 | — | good |
| 4 | — | 505 | 2 | 1980 | 307 | 84 | 495 | 24 | 95 | — | very good |
| 5 | — | 485 | 0.5 | 1980 | 314 | 84 | 495 | 24 | 95 | — | very good |
| 6 | — | 552 | — | 2150 | 409 | 81 | 515 | 25 | 95 | + | fair |

TABLE 1-continued

| example | a | b | c | d before | d after | d elim. % | e before | e after | e elim. % | f | j |
|---|---|---|---|---|---|---|---|---|---|---|---|
| 7 | — | 504 | 2[1] | 2100 | 296 | 86 | 515 | 25 | 95 | — | good |
| 8 | — | 464 | 0.5[1] | 2100 | 315 | 84 | 515 | 25 | 95 | — | very good |
| 9 | — | 500 | 1.5[3] | 2200 | 352 | 84 | 870 | 43 | 95 | — | good |
| 10 | 400 | — | 1.5[3] | 2180[2] | 858 | 61 | / | / | / | — | |
| 11 | — | 400 | 1.5[3] | 2180[2] | 484 | 78 | / | / | / | — | | a - Al—sulfate (mg Al/l);
b - polym. Al—chloride (mg Al/l) Sachtoklar;
c - aluminosilicate (g/l)
d - COC—Value (mg $O_2$/l);
e - $P_2O_5$—content (mg/l);
f turbidity;
g filterability
[1] alumosilicate with $H_2SO_4$ adjusted to pH in aqueous suspension
[2] pH-value or sewage adjusted with $H_2SO_4$ to ab. 9
[3] ab. ⅓ of this amount of alumosilicate in the sewage originated from aluminosilicate-containing detergents

EXAMPLES 4 AND 5

Even better results are obtained according to the process of the invention if a basic polymeric aluminum chloride (Sachtoklar, Sachtleben Chemie GmbH) is used as a flocculant instead of aluminum sulfate. The deposits are very easily filtrable with high elimination rates.

EXAMPLES 6 TO 8

Example 6 is an example of the state of the art. Examples 7 and 8 are examples for the process of the invention and show that, when alumosilicate is used as a precipitant, the amount of polymeric aluminum salt can even be reduced with the same phosphate elimination and higher elimination rates for oxidizable water ingredients. In examples 7 and 8, the alumosilicate was used in the form of an aqueous suspension adjusted with sulfuric acid to a pH value of 4.

EXAMPLES 9 TO 11

If the sewage already contains alumosilicate from laundering, as it is the case in sewages from laundries and households, where alumosilicate-containing detergents are used, the results are comparable in examples 10 and 11 and highly alkaline sewage, which contained ab. 0.5 alumosilicate per liter sewage from the use of alumosilicate-containing detergents, was adjusted to a pH-value of ab. 9 with sulfuric acid, before aluminum sulfate or polymeric aluminum chloride were added. When alumosilicate is used in detergents, the alumosilicate is present after washing at least partly in the form of Ca- or Mg-alumosilicate. These alkaline earth-alumosilicates have the same favorable effect on the water treatment, as shown in examples 9 to 11, as the alkali-alumosilicates of example 1 to 8. This is also shown in examples 12 to 15.

EXAMPLES 12 TO 15

These examples show that equally good cleaning effects are obtained when aluminum sulfate (440 mg Al/l) and crystalline alkali metal alumosilicate (example 12), amorphous alkali metal alumosilicate (example 13), Ca-alumosilicate (example 14) and Ca/Mg-alumosilicate (example 15) are used, each in a concentration of 1 g/l. The test data are contained in table 2.

TABLE 2

| Example | alumosilicate | COC value (Mg $O_2$/l) before | after | elim. % |
|---|---|---|---|---|
| 12 | alkali metal alumosilicate, | 2100 | 273 | 87 |

TABLE 2-continued

| Example | alumosilicate | COC value (Mg $O_2$/l) before | after | elim. % |
|---|---|---|---|---|
| 13 | cryst. alkali metal alumosilicate, amorphous | 2100 | 313 | 85 |
| 14 | Ca—alumosilicate | 2100 | 315 | 85 |
| 15 | Ca—Mg—alumosilicate | 2100 | 294 | 86 |

TABLE 4

| Example | Al—sulfate (mg Al/l) | polym.Al— salt (mg Al/l) | alumo- silicate (g/l) | COC—value (mg$O_2$/l) before | after | % elim. |
|---|---|---|---|---|---|---|
| 16 | 48.5 | — | — | 170 | 64 | 62 |
| 17 | 65.0 | — | 1 | 170 | 28 | 84 |
| 18 | — | 70.5 | — | 170 | 33 | 81 |
| 19 | — | 6.3 | 2 | 170 | 23 | 87 |

EXAMPLES 16 TO 19

In the preceding examples, greatly polluted sewage with high COC-Values was cleaned. But the process of the invention can just as well be used for cleaning less polluted water, as shown in examples 16–19 of table 3.

EXAMPLES 20 AND 21

In order to demonstrate the improvement of the filterability of the precipitated products, we used examples 20 and 21, whereby example 20 represents a comparison test for a process of the state of the art, while example 21 represents an example of the process according to the invention.

In examples 20 and 21, 250 ml greatly polluted sewage was mixed with conventional precipitants and flocculants corresponding to the preceding examples. The sewage of example 21 was treated additionally with 0.3 g/l alumosilicate. Both water specimens were subsequently stirred for 90 seconds at 500 rpm and placed on a fluted filter MN 614/1/4 filtering at a medium speed, and the filtering rate was measured. It was found that the water specimen with the addition of alumosilicate could be filtered about two to three times faster than the water specimen without alumosilicate. The test results are contained in table 4.

TABLE 4

| Example | COC—Value before | (mg$O_2$/l) after | amount of filtrate (ml) | time (sec.) | alumosilicate (g/l) |
|---|---|---|---|---|---|
| 20 | 2180 | 850 | 50 | 50 | 0 |

TABLE 4-continued

| Example | COC-Value before | (mgO$_2$/l) after | amount of filtrate (ml) | time (sec.) | alumosilicate (g/l) |
| --- | --- | --- | --- | --- | --- |
|  |  |  | 100 | 95 |  |
|  |  |  | 150 | 135 |  |
|  |  |  | 200 | 215 |  |
|  |  |  | 220 | 295 |  |
| 21 | 2180 | 330 | 50 | 15 | 0.3 |
|  |  |  | 100 | 35 |  |
|  |  |  | 150 | 55 |  |
|  |  |  | 200 | 80 |  |
|  |  |  | 230 | 150 |  |

Corresponding tests on a larger scale (several cu m) with laundry sewage, carried out at 40 to 55 degC. in agitator vessels with a MIG.-agitator with 3 spoilers, where the diameter ratio of agitator to agitator vessel was 0.8 and the agitator speed between 50 and 70 rpm, led to comparable results. It was also found that there were no great differences in the elimination rates in the temperature range between 20 and 60 degC. A reduction of the pH-value of the sewage to about 6 yielded excellent results as far as the elimination rate and the filtering proerty are concerned. By using the process of the invention several times (up to 25 times in succession) up to 75% of the water used could be recovered after the treatment as wash water without any marked deterioration of the washing results.

EXAMPLE 22

In this example we used as a precipitant a zeolite type X of the molar composition $$1.06 Na_2O.Al_2O_3.2.48 SiO_2$$

in an amount of 1 g per liter sewage. As a flocculant was used a basic polymeric aluminum chloride ("Sachtoklar" by Sachtleben) corresponding to an Al-concentration of 612 mg per liter sewage. The sewage was adjusted with sulfuric acid to a pH value of 6.2. The initial COC-value of the sewage was 2640 mg O$_2$ per liter; after the easily filterable deposit had been separated, the COC-value of the treated water had dropped to 154 mg O$_2$ per liter, which corresponds to an elimination rate of 94.2%.

We claim:

1. Process for the treatment of sewage precipitation using conventional precipitants selected from the group consisting of aluminum sulfate, iron sulfate, alkali metal silicates, and mixtures thereof and conventional flocculants selected from the group consisting of anionic or nonionic high-molecular acrylic polymers and polymeric basic aluminum salts, characterized in that, in addition to said conventional precipitants and said conventional flocculants in an amount sufficient to cause precipitation or flocculation of the solid matter in the sewage, from about 0.1 to 10 g per liter of sewage of an X-ray amorphous or crystalline, finely divided alkali metal and/or alkaline earth metal aluminosilicate of the formula:

$$x \; cat_{2/n}O.Al_2O_3.y \; SiO_2$$

where x has a value of 0.7 to 1.5, y a value of 0.8 to 6, cat denotes sodium, potassium, magnesium or calcium, and where n has the value of 1 or 2, and which preferably contains bound water; is added to the sewage to be treated, which has been adjusted, if necessary, to a weakly acid or a weakly alkaline pH-value, and that the deposit formed is separated from the water.

2. Process according to claim 1, characterized in that a crystalline aluminosilicate is used.

3. Process according to claim 1 or 2, characterized in that 0.2 to 5.0 g per liter of an alkali metal and/or an alkaline earth metal aluminosilicate are added to the water to be treated.

4. The process of claim 3 characterized in that 0.3 to 3.0 g per liter of an alkali metal and/or alkaline earth metal aluminosilicate are added to the water to be treated.

5. Process according to claim 2 wherein 0.2 to 5.0 g per liter of an alkali metal and/or an alkaline earth metal aluminosilicate are added to the water to be treated.

6. Process according to claim 2 wherein the sewage to be treated contains x g of aluminosilicate per liter and is treated with 0.1 to 10 less x g of aluminosilicate per liter of sewage.

7. Process according to claim 1, characterized in that the alumosilicate is added in the form of an aqueous suspension, adjusted if necessary to a pH value of 3.5 to 5.0.

8. Process according to claim 1, characterized in that the water to be treated is adjusted to a pH-value of 5.0 to 10.0.

9. Process according to claim 7 or 8, characterized in that the pH-value is adjusted with strong acids.

10. The process of claim 9 wherein said strong acid is sulfuric acid.

11. Process according to claim 1, characterized in that the alumosilicate is added to the water to be treated after the absorption of soil.

12. Process according to claim 1, characterized in that the sewage to be treated contains x g of aluminosilicate per liter, and is treated with 0.1 to 10 g less x g aluminosilicate per liter of sewage.

13. Process for the treatment of sewage precipitation using conventional precipitants selected from the group consisting of aluminum sulfate, iron sulfate, alkali metal silicates, and mixtures thereof and conventional flocculants selected from the group consisting of anionic or nonionic highmolecular acrylic polymers and polymeric basic aluminum salts characterized in that, in addition to said conventional precipitants and said conventional flocculants in an amount sufficient to cause precipitation or flocculation of the solid matter in the sewage, from about 0.1 to 10 g per liter of sewage of x-ray amorphous or crystalline finely divided aluminosilicates selected from the group consisting of sodium, potassium, magnesium and calcium salts of zeolites of the type of A, P, X and Y, preferably containing bound water, is added to the sewage to be treated, which has been adjusted, if necessary, from a weakly acid to a weakly alkaline pH-value, and the deposit formed is separated from the water.

* * * * *